(12) United States Patent
Pfingsten et al.

(10) Patent No.: US 12,459,577 B2
(45) Date of Patent: Nov. 4, 2025

(54) VEHICLE FRONT END ASSEMBLY (71) Applicant: NISSAN NORTH AMERICA, INC., Franklin, TN (US)

(72) Inventors: Stephen Pfingsten, Royal Oak, MI (US); David Coakley, Macomb, MI (US); Tony Tognetti, Brownstown Township, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 478 days.

(21) Appl. No.: 17/965,682

(22) Filed: Oct. 13, 2022

(65) Prior Publication Data
US 2024/0124067 A1 Apr. 18, 2024

(51) Int. Cl.
*B62D 25/08* (2006.01)
*B60R 19/52* (2006.01)
*E05B 83/24* (2014.01)

(52) U.S. Cl.
CPC ............ *B62D 25/085* (2013.01); *B60R 19/52* (2013.01); *B60R 2019/525* (2013.01); *E05B 83/24* (2013.01); *E05B 83/243* (2013.01)

(58) Field of Classification Search
CPC .... B62D 25/085; B62D 25/084; B62D 25/12; B60R 19/25; B60R 2019/525; E05B 83/243; E05B 83/24
See application file for complete search history.

(56) References Cited

U.S. PATENT DOCUMENTS

| | | | | |
|---|---|---|---|---|
| 6,189,958 | B1 * | 2/2001 | Guyomard | B62D 29/001 296/203.02 |
| 6,273,496 | B1 * | 8/2001 | Guyomard | B62D 29/001 296/193.09 |
| 6,502,653 | B1 * | 1/2003 | Balzer | B62D 29/008 296/203.02 |
| 6,679,545 | B1 * | 1/2004 | Balzer | B62D 25/084 296/203.02 |

(Continued)

FOREIGN PATENT DOCUMENTS

CN 210653357 U * 6/2020
KR 20050114027 A 12/2005

(Continued)

OTHER PUBLICATIONS

Translation of CN-210653357-U, Mar. 8, 2025.*

*Primary Examiner* — Jason S Morrow
(74) *Attorney, Agent, or Firm* — Global IP Counselors, LLP (57) ABSTRACT

A vehicle front end assembly includes a grille, a front end module, an upper grille panel and a bell crank assembly. The front end module has a radiator positioned rearwardly with respect to the grille. The upper grille panel extends rearwardly with respect to the grille and overlies the front end module. The upper grille panel has a bell crank access area. The bell crank assembly is positioned in the bell crank access area of the upper grille panel. The bell crank assembly has a bell crank that is movable with respect to the upper grille panel. The bell crank assembly further has an airflow barrier that is fixedly supported with respect to the bell crank assembly. The airflow barrier has a front wall that is positioned forward of the bell crank to deflect air flow received through the grille.

16 Claims, 12 Drawing Sheets (56) References Cited

U.S. PATENT DOCUMENTS

| | | | | |
|---|---|---|---|---|
| 7,644,966 | B2* | 1/2010 | Huber | B60Q 1/0433 |
| | | | | 296/193.09 |
| 8,100,209 | B2* | 1/2012 | Goldsberry | F02M 35/161 |
| | | | | 180/68.1 |
| 9,016,772 | B2* | 4/2015 | Townson | B62D 25/085 |
| | | | | 296/193.1 |
| 9,988,006 | B2* | 6/2018 | Aizawa | B60R 19/52 |
| 10,308,287 | B2* | 6/2019 | Gupta | B62D 21/15 |
| 10,596,994 | B2* | 3/2020 | Yoshimoto | B60R 21/34 |
| 11,486,168 | B2* | 11/2022 | Oyama | E05B 79/20 |
| 12,139,085 | B2* | 11/2024 | Tashiro | B62D 21/15 |
| 12,233,945 | B2* | 2/2025 | Nagai | B62D 25/105 |
| 2006/0237999 | A1* | 10/2006 | Sasaki | E05B 83/24 |
| | | | | 296/203.02 |
| 2015/0343973 | A1* | 12/2015 | Stoenescu | B60R 19/12 |
| | | | | 293/133 |
| 2018/0347238 | A1* | 12/2018 | Otani | E05B 77/02 |
| 2019/0241138 | A1* | 8/2019 | Salter | B60Q 3/64 |
| 2024/0123815 | A1* | 4/2024 | Pfingsten | B60K 11/08 |

FOREIGN PATENT DOCUMENTS

| | | |
|---|---|---|
| KR | 100643999 B1 | 11/2006 |
| KR | 101273896 B1 | 6/2013 |
| KR | 101297559 B1 | 8/2013 |
| KR | 101471363 B1 | 12/2014 |

* cited by examiner

VEHICLE FRONT END ASSEMBLY

BACKGROUND

Technical Field

The present disclosure generally relates to a vehicle front end assembly. More specifically, the present disclosure relates to a vehicle front end assembly having a bell crank assembly.

Background Information

Front end module heat exchangers perform most efficiently when large quantities of air can be used to remove heat from the fluid inside the heat exchangers. Front end modules heat exchangers include radiators, condensers, transmission oil coolers, etc. The radiator fluid (coolant), the condenser fluid (refrigerant), and transmission oil cooler fluid (transmission oil) become hot during vehicle operation. Air entering the vehicle grill can cool the heat exchanges and the fluid inside the heat exchangers. Airflow to the radiator can be improved by adding seals or airflow barriers to channel air to the radiator. These airflow barriers prevent air from bypassing the radiator and maximize radiator cooling efficiency.

SUMMARY

In view of the state of the known technology, one aspect of the present disclosure is to provide a vehicle front end assembly comprises a grille, a front end module, an upper grille panel and a bell crank assembly. The front end module has a radiator positioned rearwardly with respect to the grille. The upper grille panel extends rearwardly with respect to the grille and overlies the front end module. The upper grille panel has a bell crank access area. The bell crank assembly is positioned in the bell crank access area of the upper grille panel. The bell crank assembly has a bell crank that is movable with respect to the upper grille panel. The bell crank assembly further has an airflow barrier that is fixedly supported with respect to the bell crank assembly. The airflow barrier has a front wall that is positioned forward of the bell crank to deflect air flow received through the grille.

In view of the state of the known technology, another aspect of the present disclosure is to provide a bell crank assembly for a vehicle. The bell crank assembly comprising a bell crank and a bell crank housing. The bell crank is movable with respect to the bell crank housing. The bell crank housing has a receptacle defined by a front wall, a bottom wall, and a pair of sidewalls and a rear wall. The bell crank is movably disposed within the receptacle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
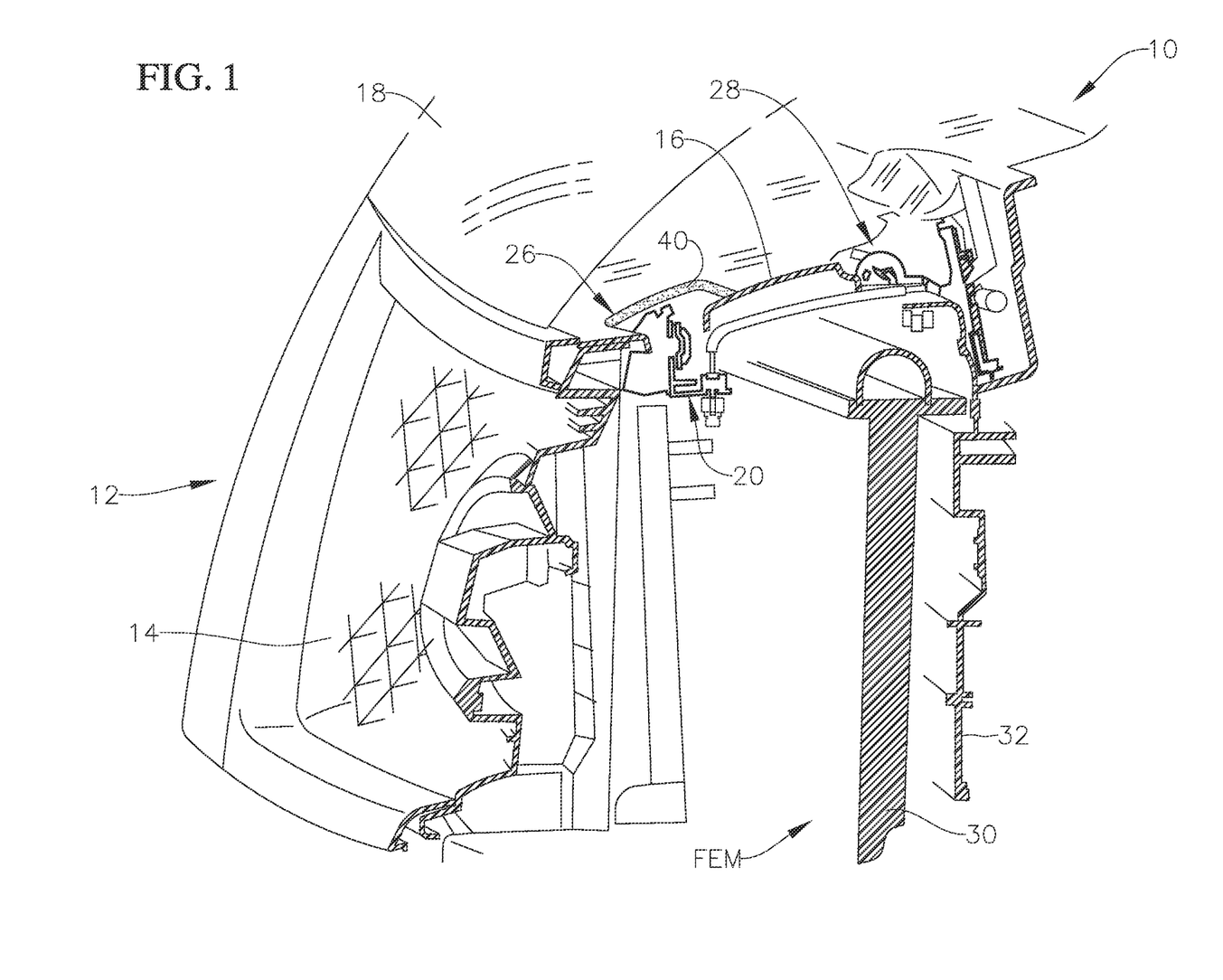
FIG. 1 is a cross-sectional perspective view of a portion of a vehicle front end assembly in accordance with an illustrated embodiment.

Referring initially to FIG. 1, a portion of a vehicle is illustrated as being equipped with a vehicle front end assembly 12. The vehicle front end assembly 12 comprises a grille 14, a front end module FEM and a upper grille panel 16. The vehicle front end assembly 12 further comprises a hood 18 openable and closeable to overlie the upper grille panel 16. In the illustrated embodiment, the vehicle front end assembly 12 further comprises a bell crank assembly 20, as will be further described below.

FEMs can include one or more heat exchanger units for heating and/or cooling various components of the vehicle 10. As shown, the front end module FEM is fixed to the body structure of a vehicle front end and is located in front of the vehicle's engine compartment C. The front end module (FEM) is primarily provided to the vehicle 10 for intaking air from the environment and cooling the fluid in the heat exchangers.

The vehicle grille 14 allows air to enter through the engine compartment C towards the front end module FEM during vehicle use. The hood 18 is hingedly coupled to the vehicle body and overlies the engine compartment C of the vehicle 10. As shown in FIG. 1, the vehicle 10 includes a hood lock 24 or latch that is concealed underneath the hood 18. In particular, the hood lock 24 extends through the upper grille panel 16. The bell crank assembly 20 is further extends through the upper grille panel 16 and the hood 18 overlies the upper grille panel 16 to overly the bell crank assembly 20 and the hood lock 24 when the hood 18 is closed. The hood 18 can be constructed from steel, aluminum, carbon fiber, fiberglass, and/or dry carbon.

The upper grille panel 16 extends rearwardly with respect to the grille 14. The upper grille panel 16 is typically a plastic cover or guard that protects the components of the FEM when the hood 18 is opened. The upper grille panel 16 is typically fixed to the grille 14 as a separate or integral piece with the grille 14. The upper grille panel 16 includes a bell crank access area 26 for accessing the bell crank assembly 20 for maintenance and use when the user opens the hood 18. The upper grille panel 16 further includes a hood lock access area 28 for accessing the hood lock 24 for maintenance and use when the user opens the hood 18. The bell crank access area 26 and the hood lock access area 28 include openings in the upper grille panel 16 to allow the hood 18 to engage the bell crank 20 and the hood lock 24, respectively. The bell crank assembly 20 and the hood lock 24 are fixedly attached to the components of the FEM.

The vehicle 10 preferably includes one or more mostly sealed pathways connecting the grille 14 and the FEM (e.g., a radiator) for air to flow rearward therethrough. Preferably, the upper grille panel 16 partially forms part of the pathway by channeling air to flow from the grille 14 rearwardly therethrough to the components of the FEM, particularly the radiator unit 30. As best seen in FIG. 1, the upper grille panel 16 overlies the front end module FEM. The upper grille panel 16 can be made by injection mold with a ridged main body.

As shown in FIG. 1, a portion of the front end module FEM that can be implemented with the vehicle 10 of FIG. 1 is illustrated. The front end module FEM comprises one or more front end module FEM structures that can include, for example, a fan (not shown), the radiator unit 30 and a heat exchanger unit H (e.g., transmission cooler, condenser unit). The fan, the radiator unit 30, the heat exchanger units H and the attachment structures, can all be considered front end module FEM structures of the illustrated embodiment. In particular, the FEM can include a support frame 32 that is an attachment structure. The support frame 32 can support the radiator unit 30 and the fan.

Figure 3:
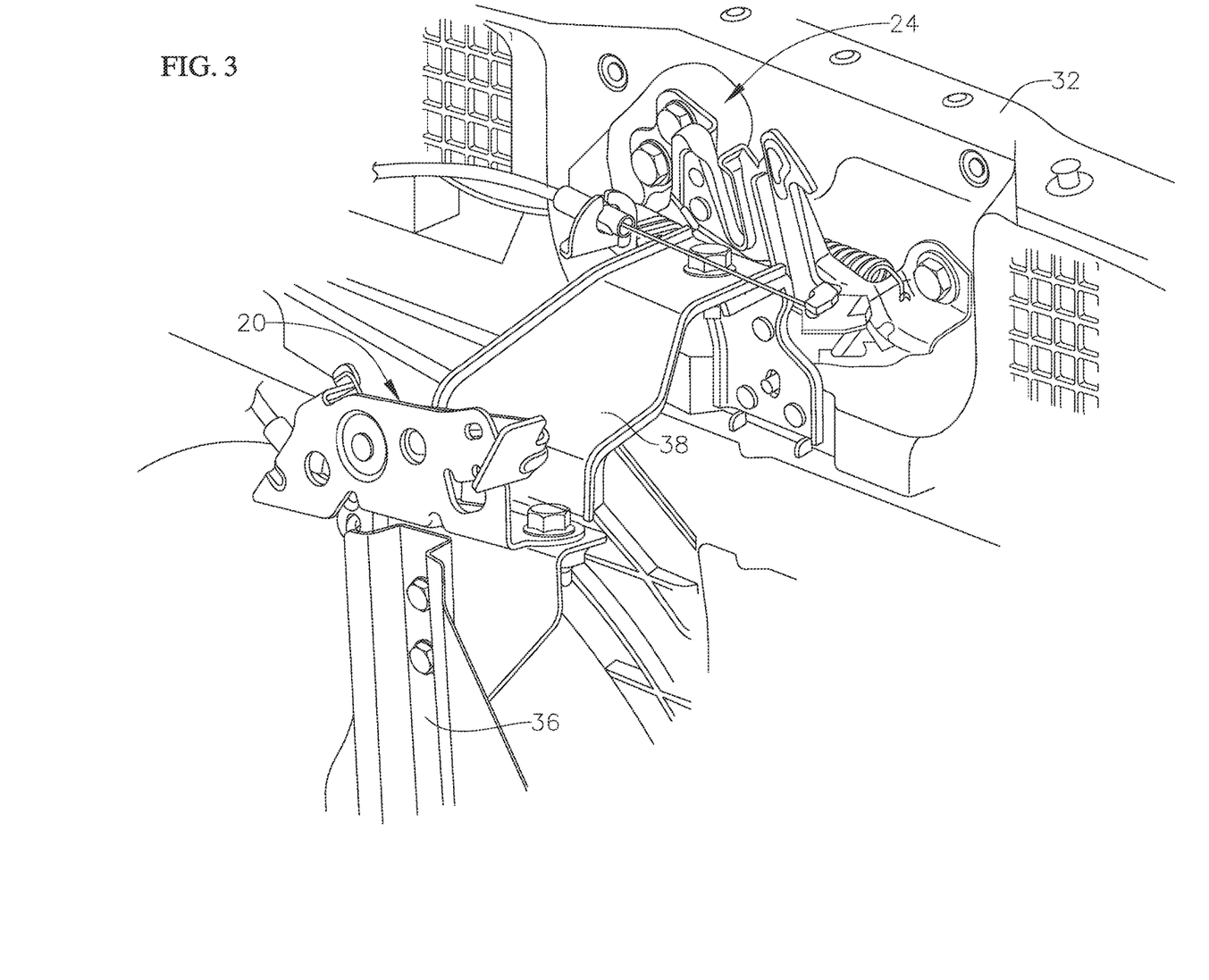
FIG. 3 is a front perspective view of the vehicle front end assembly similar to FIG. 2 but with an upper grille panel removed.
Figure 4:
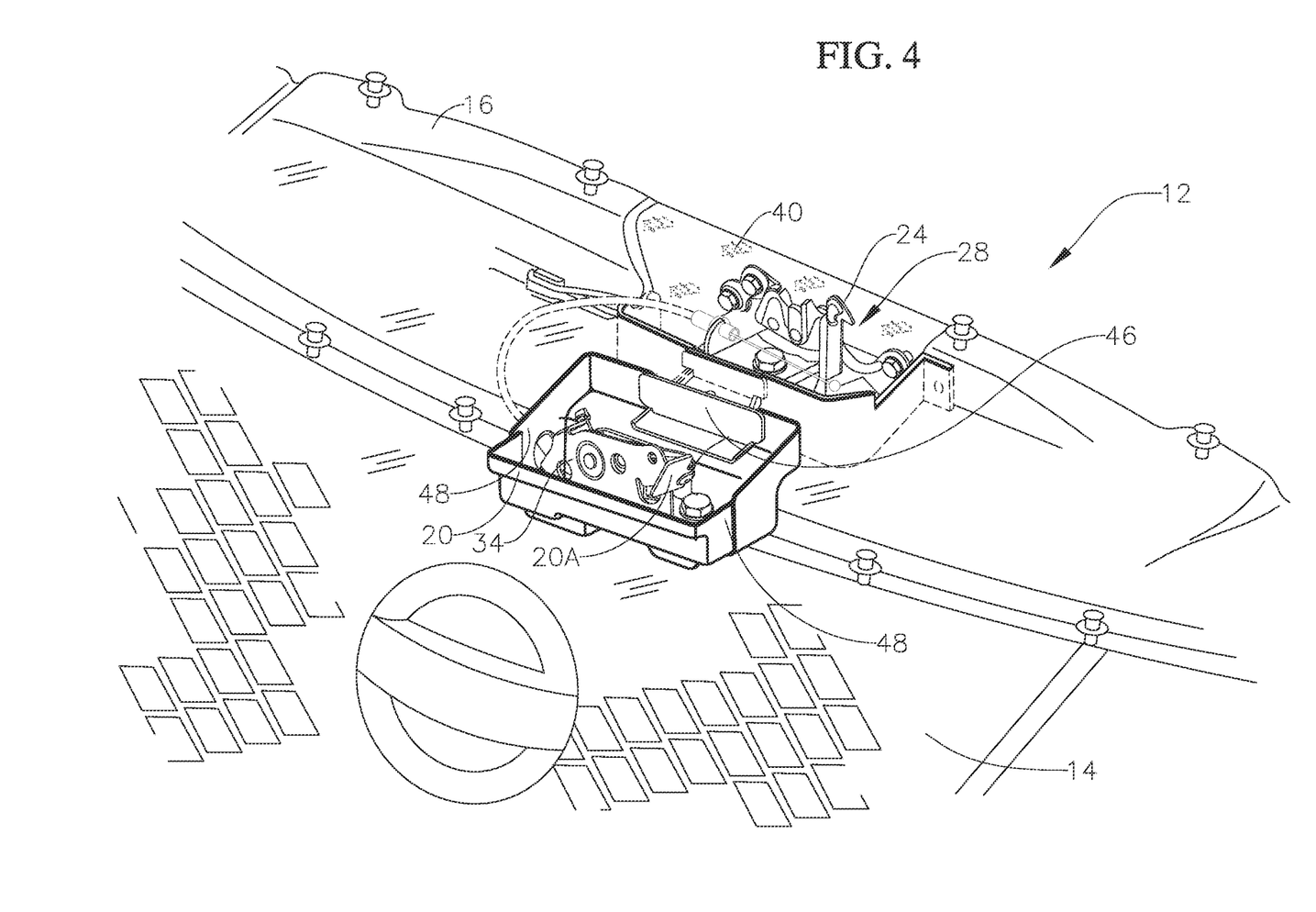
FIG. 4 is a front perspective view of the vehicle front end assembly similar to FIG. 2 but being equipped with a bell crank assembly in accordance with an illustrated embodiment.
Figure 5:
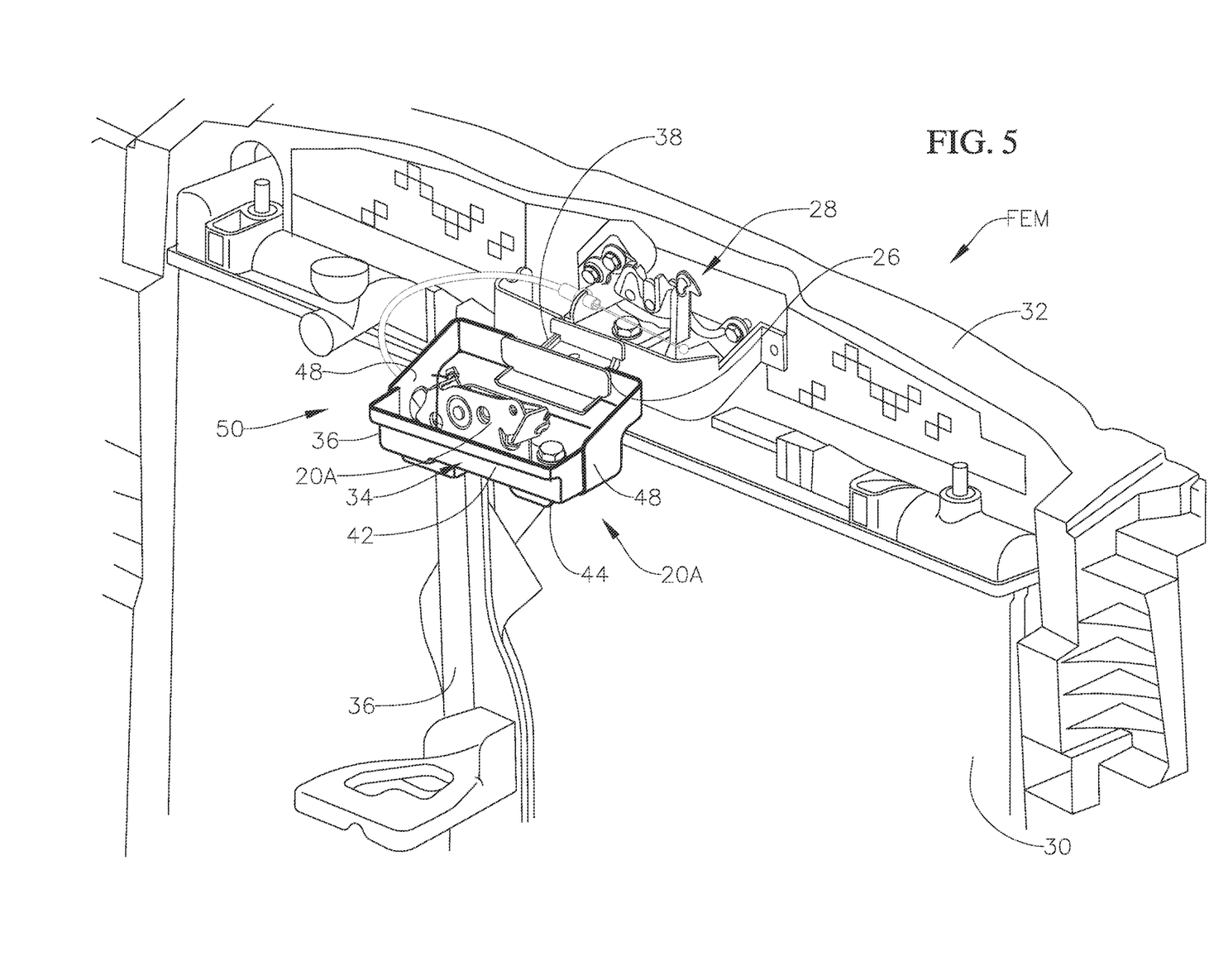
FIG. 5 is a front perspective view of the vehicle front end assembly with the upper grille panel removed to show the bell crank assembly.

Referring to FIGS. 3 to 5, the radiator unit 30 cools the vehicle's 10 engine by receiving and cooling hot liquid from the engine. As shown, the radiator unit 30 has a radiator core and a pair of radiator tanks disposed on opposite lateral sides (or upper and lower ends as shown in FIG. 1) of the radiator core (one radiator tank shown in the Figures). Therefore, the radiator unit 30 includes a radiator tank that is typically made of plastic, or alternatively made of metal. The radiator core is comprised of many small tubes (not shown) that can be equipped with many radiator fins to dissipate heat rapidly. The radiator fins are made of metal, such as brazed aluminum. Fluid flows between the interior of the radiator tanks and the interior of the radiator core where the fluid is cooled.

As seen in FIG. 5, the front end module FEM can further include any mounting or attachment frames (e.g., a condenser attachment bracket 32) for supporting the front end module FEM structures together. As seen in FIG. 3, the front end module FEM can additionally include air guides for directing air received from the vehicle front end rearward through the front end module FEM structures.

Figure 6:
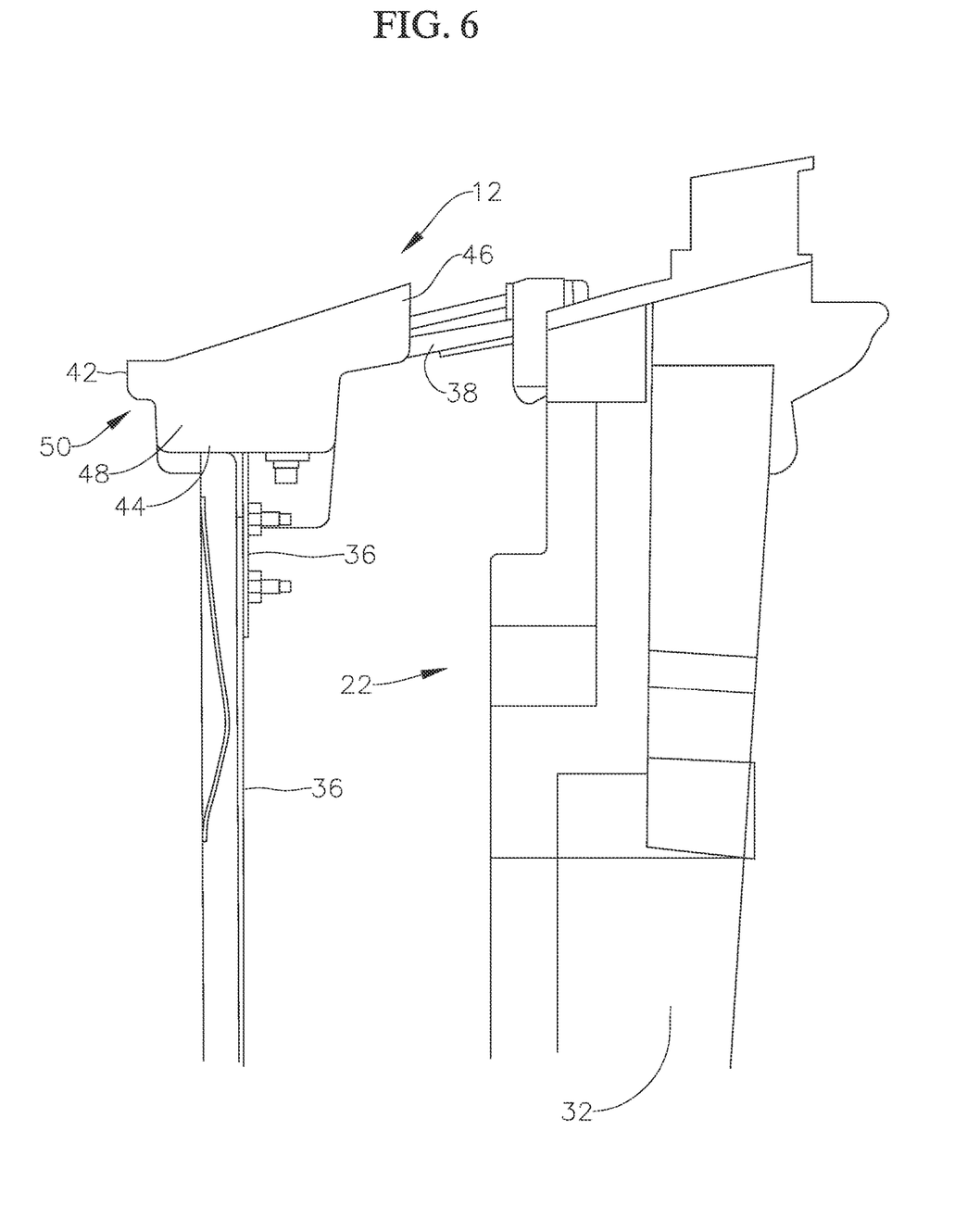
FIG. 6 is a side view of the vehicle front end assembly.
Figure 7:
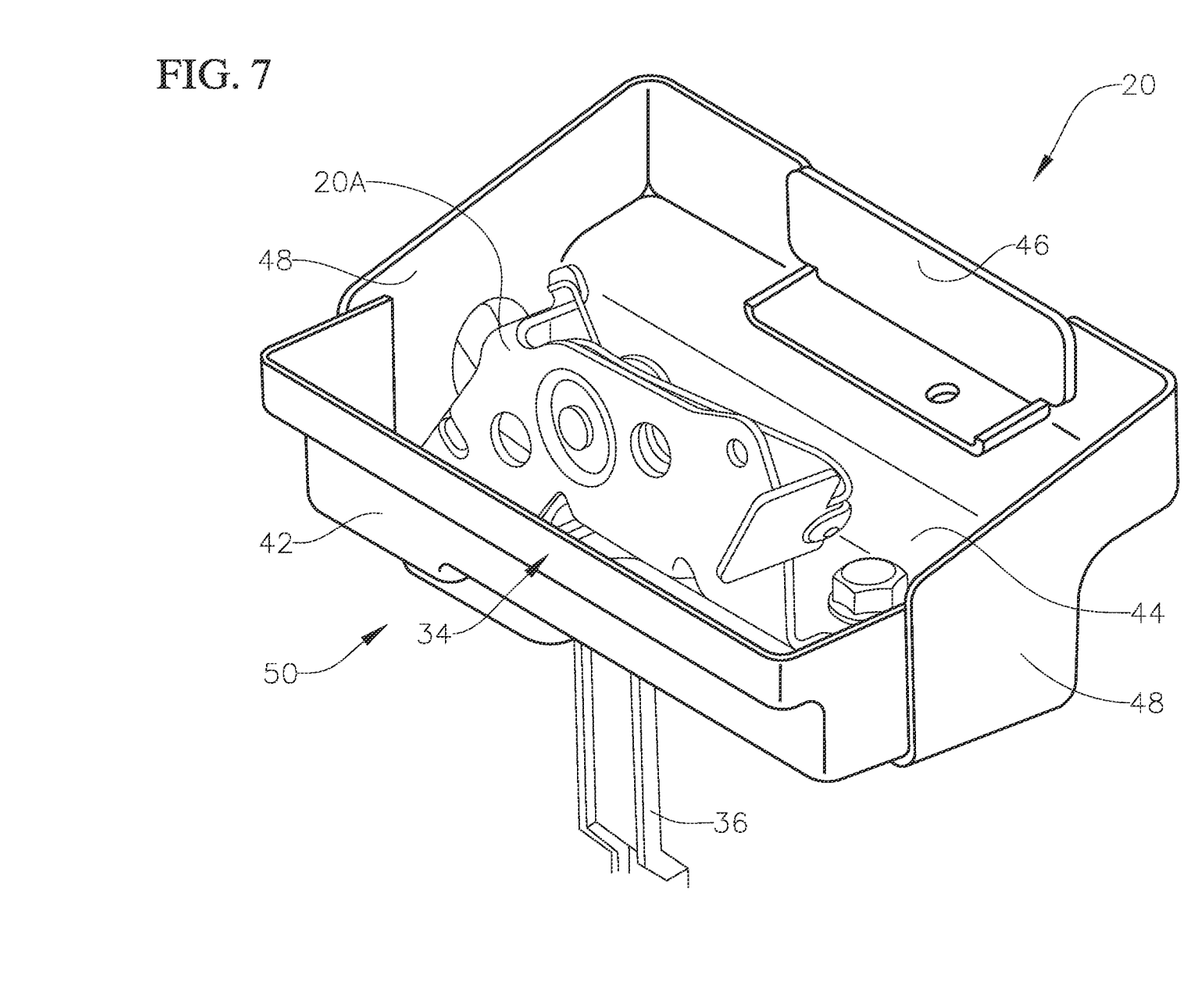
FIG. 7 is a front perspective view of the bell crank assembly.

The front end module FEM is part of a temperature control system of the vehicle 10 for maintaining a desired temperature of the vehicle's 10 interior components and passenger cabin, such as to prevent the engine from overheating. For example, the condenser unit is part of the heating, ventilation and air conditioning (HVAC) system of the vehicle 10. An evaporator heat exchanger in the passenger compartment absorbs heat from warm or hot air of the passenger compartment and transfers the heat of the air to a refrigerant in the HVAC system, Then, the refrigerant moves to the condenser of the vehicle where airflow from the grille cools the refrigerant in the condenser unit, illustrated in FIGS. 2, 6 and 7. Air cooled in the evaporator heat exchanger is then discharged from the HVAC system to the passenger compartment to improve passenger comfort.

Due to air traveling through the grille 14 and upper grille panel 16, the bell crank assembly 20 can be exposed to dust and dirt. Therefore, the vehicle 10 is provided with the bell crank assembly 20 having an airflow barrier 34 in accordance with an illustrated embodiment. In the illustrated embodiment, the airflow barrier 34 can be considered a housing or a partial housing for the bell crank 20.

The bell crank assembly 20 is positioned in the bell crank access area 26 of the upper grille panel 16. The bell crank 20 is a linkage that serves as a hood 18 release lever bell crank 20 or a hood 18 latch release for the vehicle. The bell crank 20 includes a movable lever and moving the lever releases the hood lock 24. The bell crank 20 pushes or pulls the linkage up and down to release the hood 18. As best seen in FIG. 3, the bell crank 20 is fixed to a mounting bracket 36 that is an attachment structure of the FEM. Therefore, the bell crank 20 is supported to the structures of the FEM and the upper grille panel 16 via the mounting bracket 36. However, it will be apparent to those skilled in the vehicle field from this disclosure that the bell crank 20 can be attached other structures of the FEM. Alternatively, it will also be apparent to those skilled in the vehicle field from this disclosure that the bell crank 20 can be directly fixed to other metal structures in the FEM area.

Figure 2:
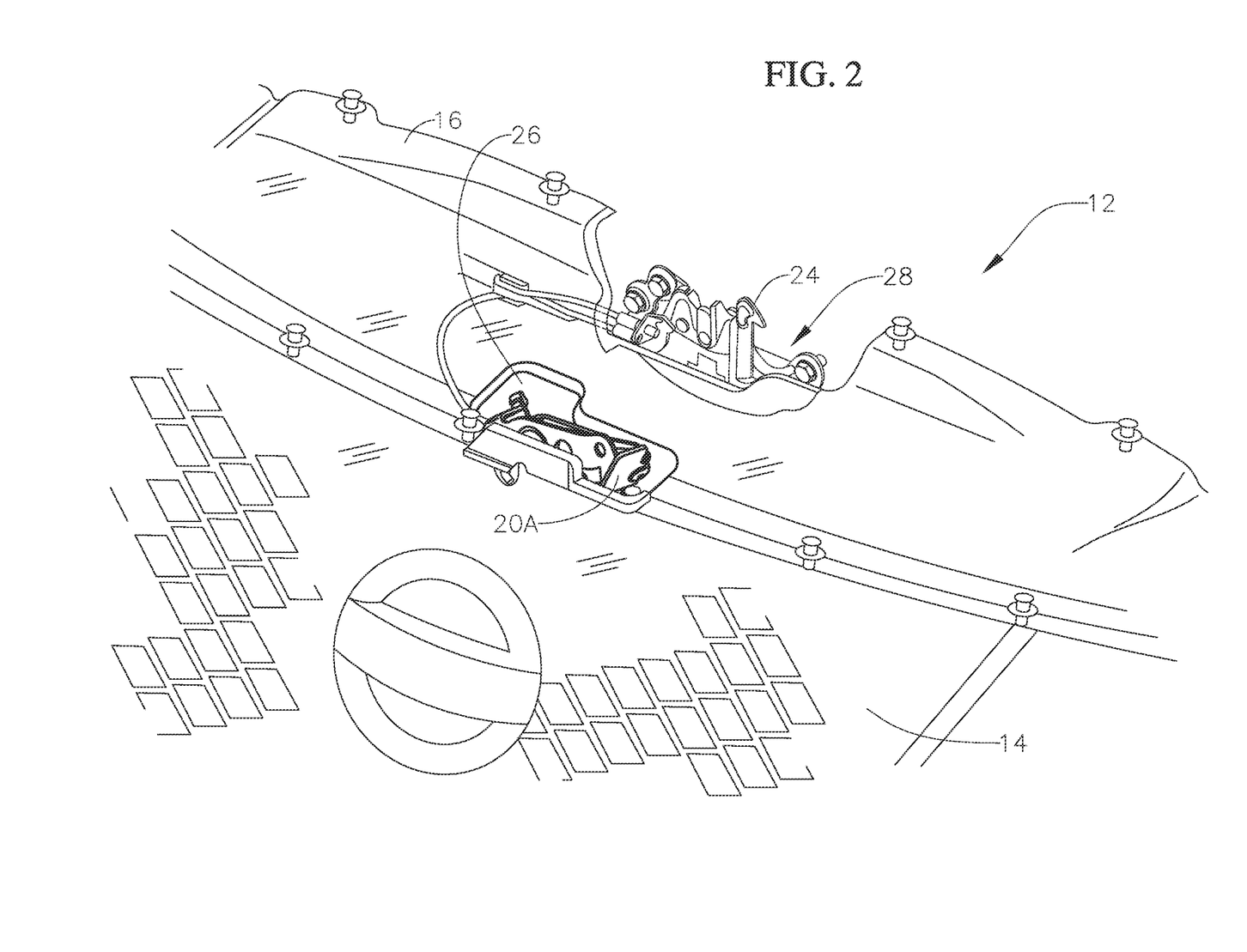
FIG. 2 is a front perspective view of the vehicle front end assembly of FIG. 1.

Preferably, the bell crank assembly 20 is positioned slightly underneath the upper grille panel 16 and accessible via the bell crank access area 26, as shown in FIGS. 1 and 2. The bell crank 20 is movable with respect to the bell crank access area 26. As shown, the bell crank 20 is supported to the front end module FEM at a position that is forward of the radiator unit 30.

As seen in FIG. 3, the mounting bracket 36 includes an upper horizontal portion, a vertical portion and a lower horizontal portion (not shown). The rearward end of the upper horizontal portion attaches to the support frame 32. The forward end of the upper horizontal portion connects to the upper end of the vertical portion. The lower end of the vertical portion connects to the forward end of the lower horizontal portion. And, the rearward end of the lower horizontal portion attaches to the lower end of the support frame 32. The bell crank 22A is mounted to the forward end of the upper horizontal portion. The mounting bracket 36 is preferably made of stamped sheet metal although it could be made of any ridged material. The mounting bracket 38 can be considered part of mounting bracket 36 as a one-piece structure or provided as a separate structure.

As stated, the bell crank assembly 20 includes the airflow barrier 34. The airflow barrier 34 is fixedly supported to the FEM with respect to the bell crank assembly 20. As best seen in FIG. 4, the airflow barrier 34 preferably is mounted to a mounting bracket 36 that extends rearwardly towards the radiator unit 39. The mounting bracket 36 supports the bell crank assembly 20 to the support frame 32. Therefore, the airflow barrier 34 is also supported to the FEM via the mounting bracket in the illustrated embodiment.

As best seen in FIGS. 1 and 2, the airflow barrier 34 preferably further includes an elastic seal 40. The elastic seal 40 is disposed around a periphery of the upper end of the walls (42, 46, 48) of the airflow barrier 34. Alternatively, the elastic seal 40 can be provided around a periphery of the bell crank access area 26 on the upper grille panel 16. As shown in FIG. 1, the elastic seal 40 is positioned between the upper grille panel 16 and the upper end of the walls (42, 46, 48) of the airflow barrier 34. Alternatively, the elastic seal 40 can be disposed between the upper grille panel 16 and the hood 18. The foam can be made of synthetic rubber, such as EPDM synthetic rubber mixture designed for a variety of high performance gasketing and insulation applications. The elastic seal 40 prevents air from flowing between the upper grille panel 16 and the airflow barrier 34.

The airflow barrier 34 has a front wall 42 that is positioned forward of the bell crank 20 to deflect air flow received through the grille 14. The airflow barrier 34 includes a bottom wall 44 that extends rearwardly with respect to the front wall 42. The bottom wall 44 extends below the bell crank 20. The bottom wall 44 can have an opening for receiving an attachment structure (e.g., the mounting bracket 36) of the bell crank assembly 20 therethrough. Therefore, the mounting bracket 36 can be considered part of the bell crank assembly 20, or as an addition to the bell crank assembly 20.

The airflow barrier 34 further includes a rear wall 46 positioned rearwardly with respect to the bell crank 20 and forward of the front end module FEM. The airflow barrier 34 further includes a pair of sidewalls 48 extending from the lateral sides of the front wall 42 to the rear wall 46. Preferably, the front wall 42 and the bottom wall 44 are integrally formed. The rear wall 46 is detachably attached to the sidewalls 48 by fasteners or by snap fit. In the illustrated embodiment, the bottom wall 44 forms a main body of the airflow barrier 34. That is, the bottom wall 44 comprises a majority part of the airflow barrier 34. The front wall 42 and the rear wall 46 are attached to the main body.

The bell crank 20 and airflow barrier 34 can be attached to mounting bracket 36. Airflow barrier 34 is installed surrounding the bell crank 22A.

Therefore, in the illustrated embodiment, the airflow barrier 34 can be considered a bell crank housing 50 and the bell crank 20 sits within the bell crank housing 50. The bell crank housing 50 has a receptacle defined by the front wall 42, the bottom wall 44, and the sidewalls 48 and the rear wall 46. The bell crank 20 being movably disposed within the receptacle. Therefore, the bell crank 20 is movable with respect to the bell crank housing 50.

The bell crank housing 50 is preferably made of a rigid member, such as plastic polypropylene. As shown in FIG. 3, the bell crank assembly 20 having the bell crank 20 and the bell crank housing 50 are sized and dimensioned to be fitted to the bell crank access area 26 of the upper grille panel 16. The bell crank 20 is exposed via the top of the bell crank housing 50 so that the driver can access the bell crank 20 when the hood 18 is open.

Figure 8:
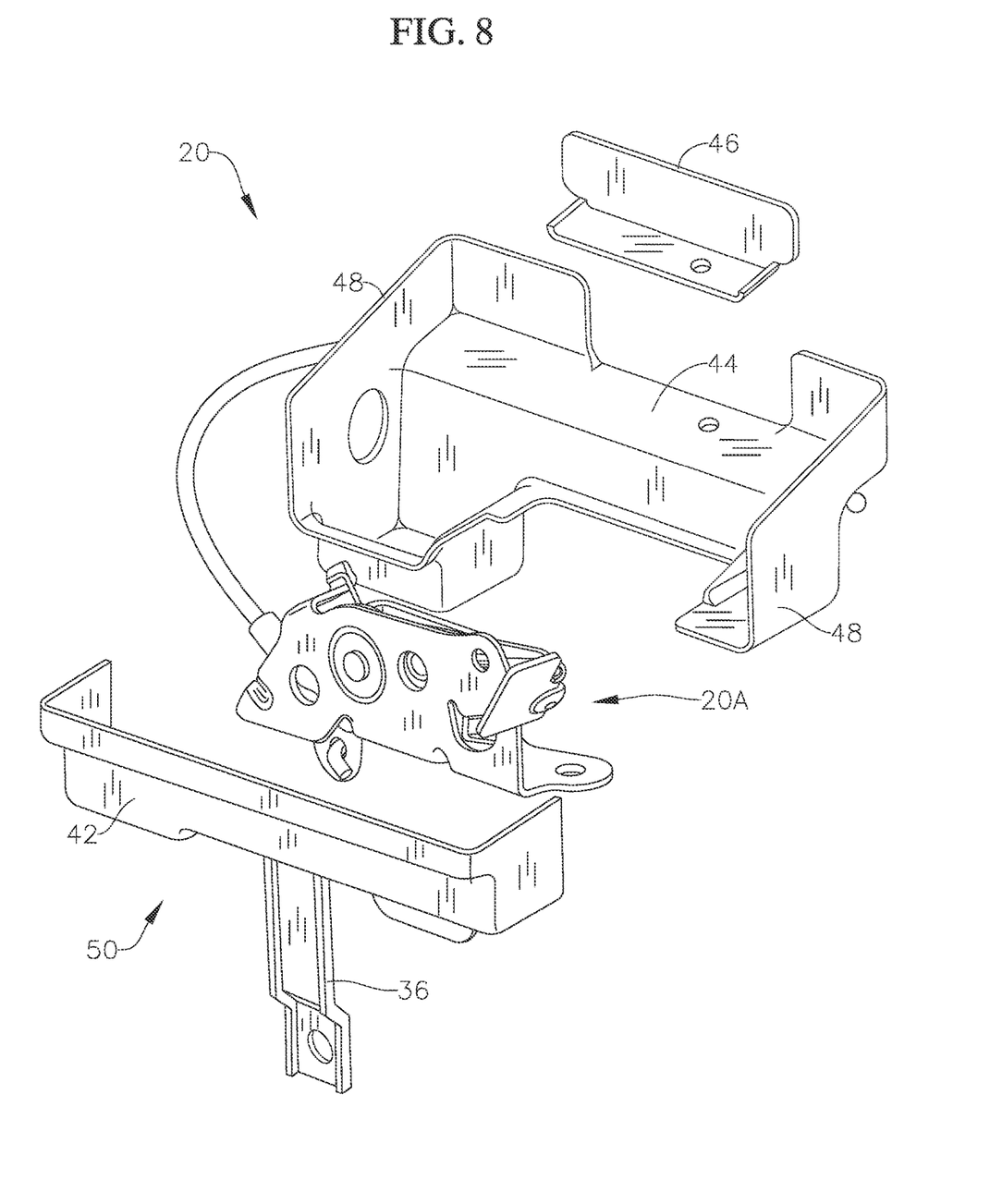
FIG. 8 is an exploded perspective view of the bell crank assembly.
Figure 9:
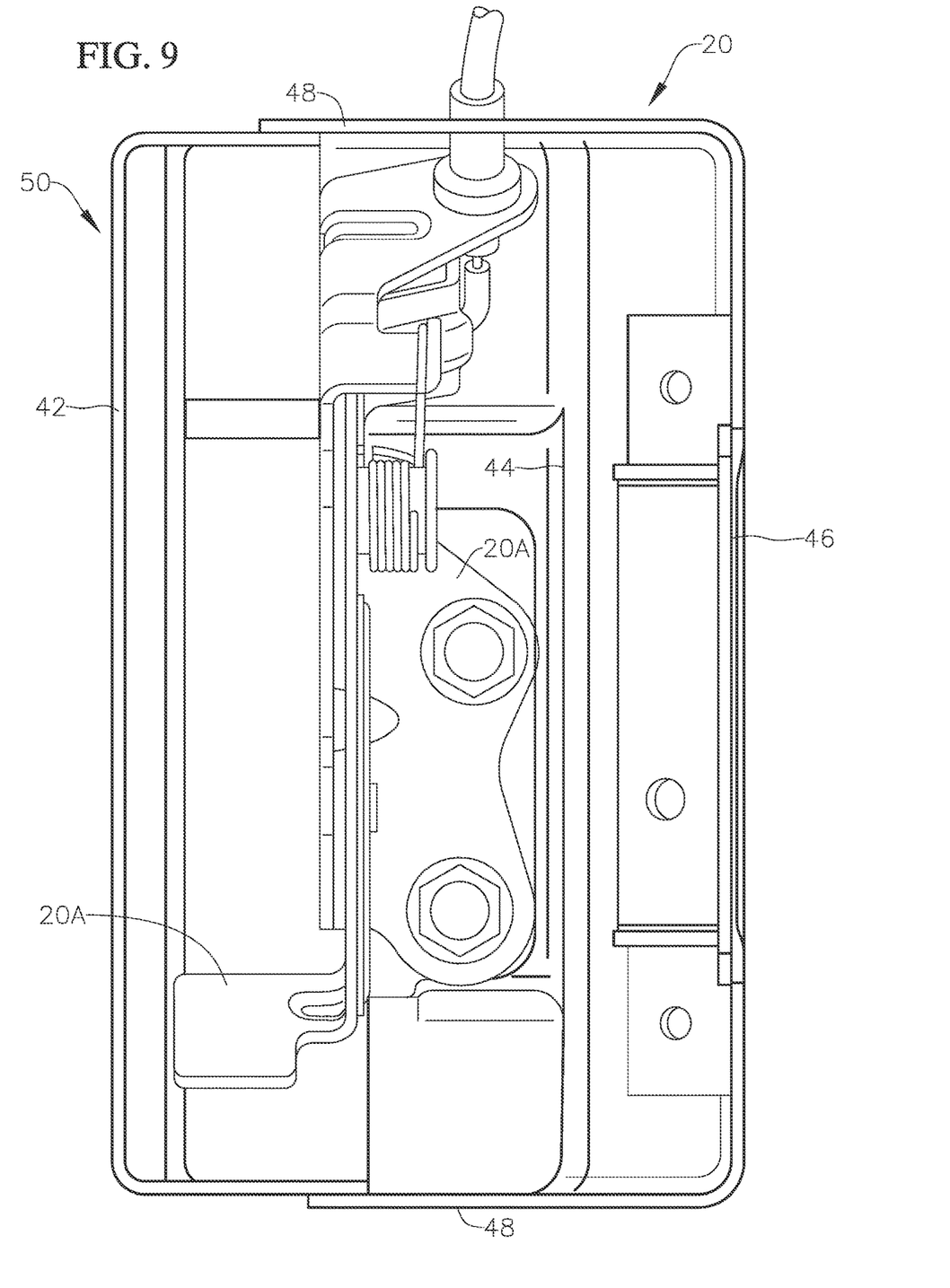
FIG. 9 is an exploded perspective view of a first modified bell crank assembly.

Referring now to FIGS. 8 and 9, a first modified bell crank assembly 120 will now be discussed. The first modified bell crank assembly 120 can be implemented with the vehicle 10 and the FEM of FIGS. 1 to 5. The first modified bell crank assembly 20 includes a bell crank 20 and a modified bell crank housing 150. The modified bell crank housing 150 is also sized and dimensioned to be fitted to the bell crank access area 26 of the upper grille panel 16. The modified bell crank housing 150 includes a front wall 142, a bottom wall 144, a pair of sidewalls 148 and a rear wall 146. The bell crank 20 is movably fixed to mounting bracket 36 via fasteners, such as shown in FIG. 9. The modified bell crank housing 150 is fixed to the mounting bracket 36 via fasteners, such as shown in FIG. 9. The modified bell crank housing 150 surrounds the bell crank 20 and prevents dust and dirt from contacting the bell crank 20 when air flows below the bell crank from the grill to the radiator.

The modified bell crank housing 150 is substantially identical to the bell crank housing 50 of FIGS. 1 to 7, except that the front wall 142, the bottom wall 144, the sidewalls 148 are integrally formed as a one-piece member that does not need assembly with respect to each other. The rear wall 146 is installed to these components as a separate piece. Therefore, the first modified housing 150 is a two-piece member and reduces assembly time during installation.

Figure 10:
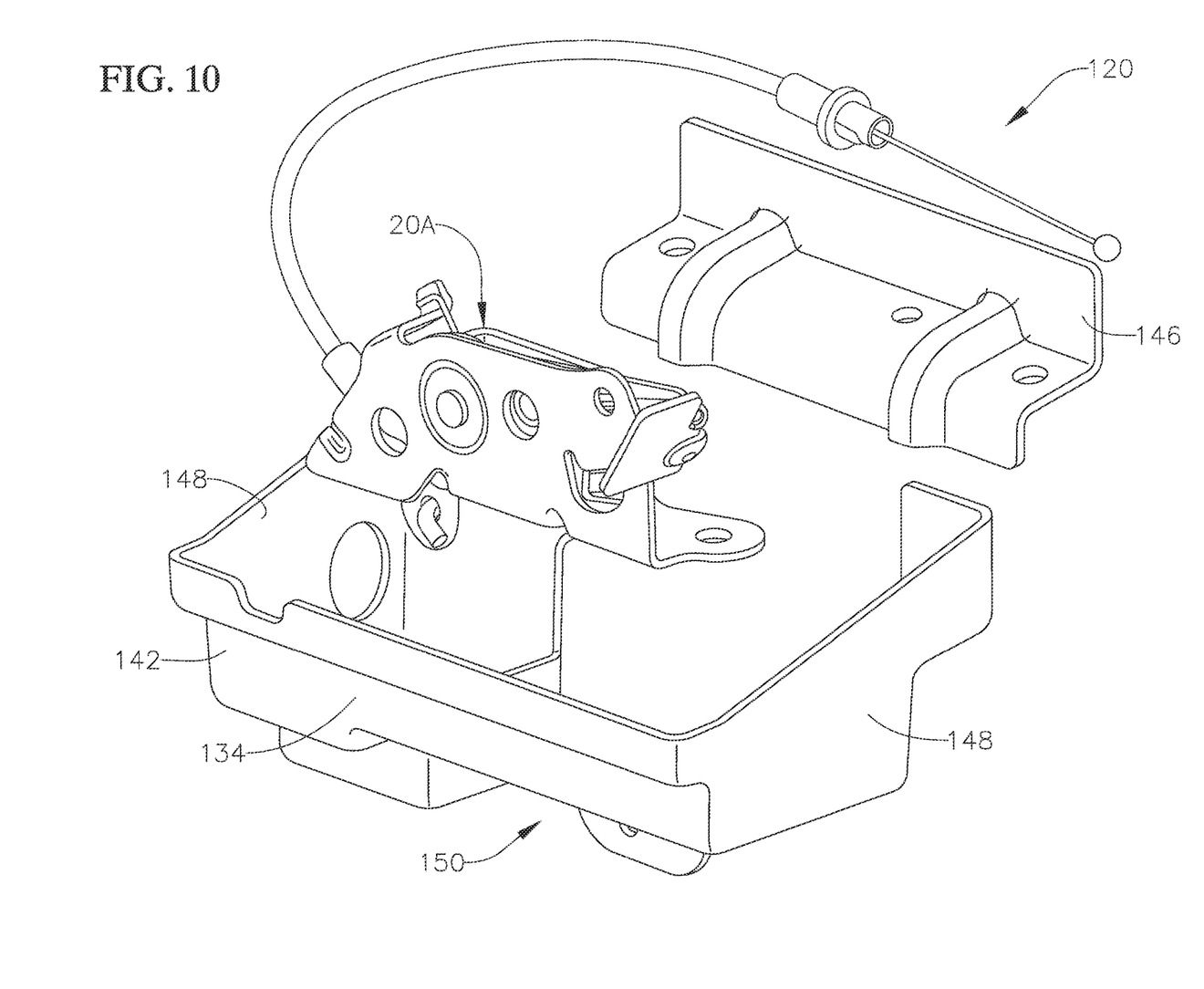
FIG. 10 is a top view of the first modified bell crank assembly.
Figure 11:
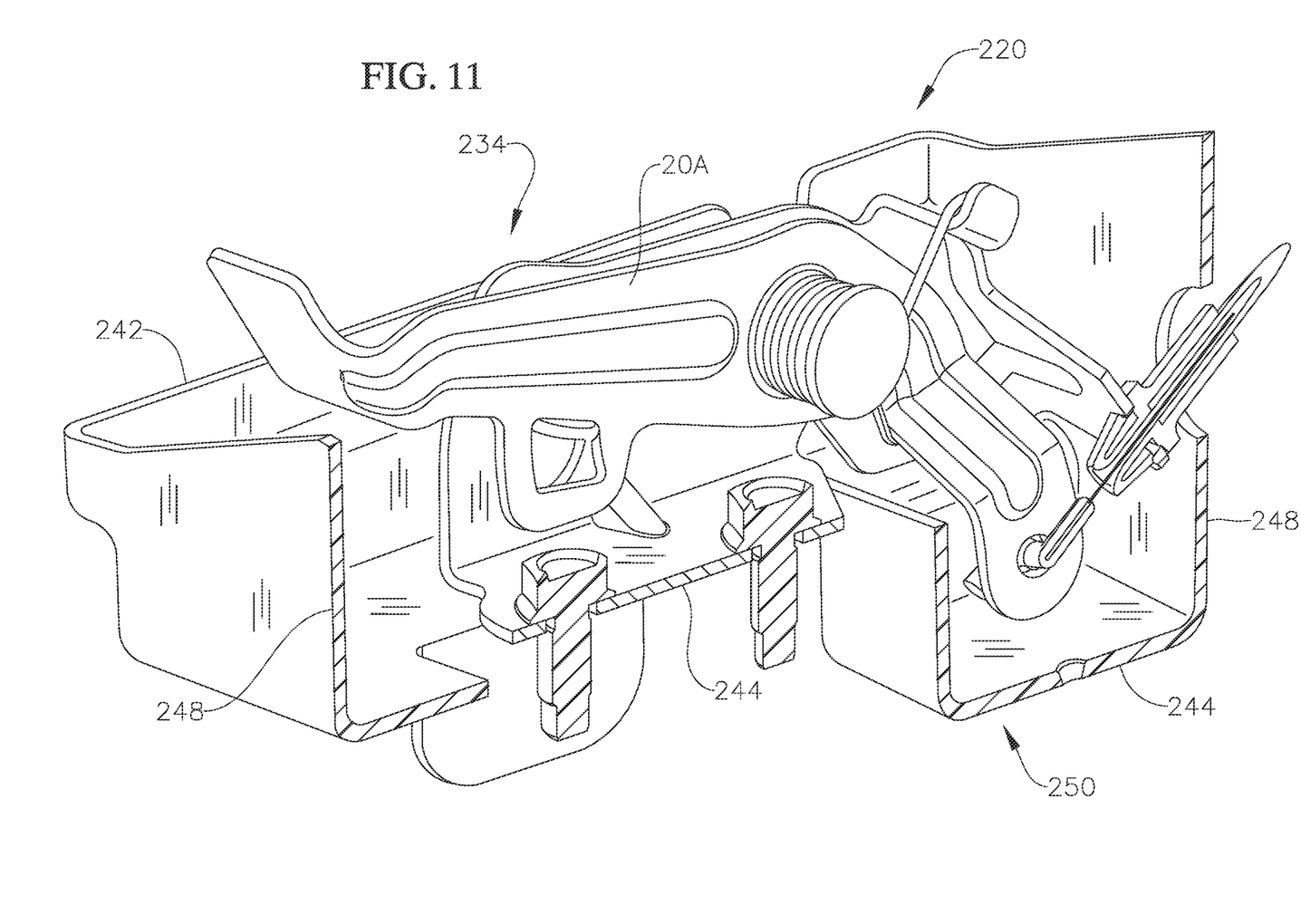
FIG. 11 is a cross-sectional view of a second modified bell crank assembly.
Figure 12:
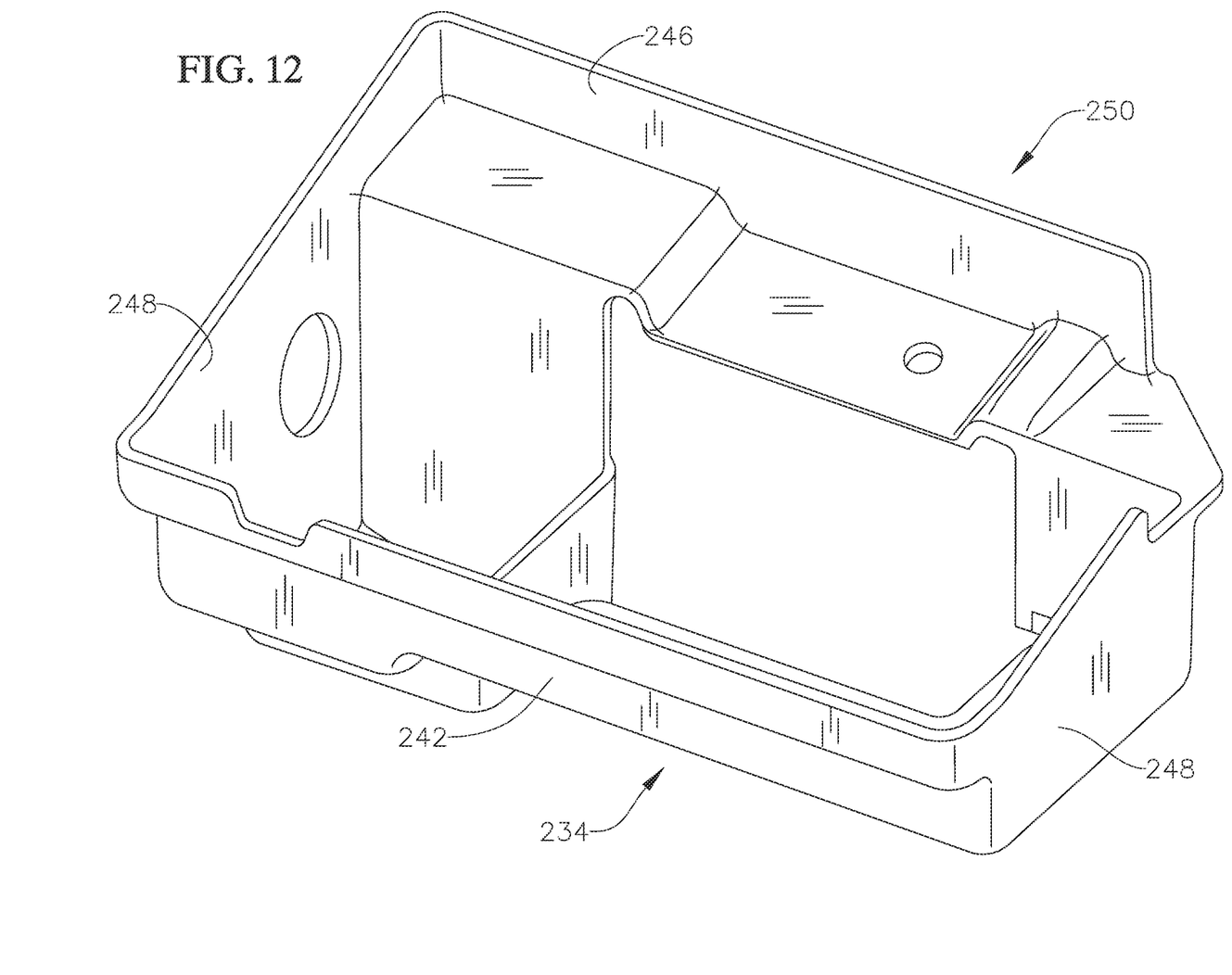
FIG. 12 is a front perspective view of a second modified bell crank housing of the modified bell crank assembly.

Referring now to FIGS. 10 and 11, a second modified bell crank assembly 220 will now be discussed. The second modified bell crank assembly 220 can be implemented with the vehicle 10 and the FEM of FIGS. 1 to 5. The second modified bell crank assembly 220 includes a bell crank 20 and a modified bell crank housing 250. The second modified bell crank housing 250 is also sized and dimensioned to be fitted to the bell crank access area 26 of the upper grille panel 16. The second modified bell crank housing 250 includes a front wall 242, a bottom wall 244, a pair of sidewalls 248 and a rear wall 246. The bell crank 20 is movably fixed to mounting bracket 36 via fasteners, such as shown in FIG. 9. The modified bell crank housing 250 is fixed to the mounting bracket 36 via fasteners, such as shown in FIG. 9. The modified bell crank housing 250 surrounds the bell crank 20 and prevents dust and dirt from contacting the bell crank 20 when air flows below the bell crank from the grill to the radiator unit 30.

The second modified bell crank housing 250 is substantially identical to the bell crank housing 50 of FIGS. 1 to 7, except that the front wall 242, the bottom wall 244, the sidewalls 248 and the rear wall 246 are integrally formed as a one-piece member that does not need assembly with respect to each other.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion." "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle front end assembly. Accordingly, these terms, as utilized to describe the present invention should be interpreted relative to a vehicle equipped with the vehicle front end assembly.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle front end assembly comprising:
a grille;
a front end module having a radiator positioned rearwardly with respect to the grille;
an upper grille panel extending rearwardly with respect to the grille and overlying the front end module, the upper grille panel having a bell crank access area; and
a bell crank assembly that is positioned in the bell crank access area of the upper grille panel, the bell crank assembly having a bell crank that is movable with respect to the upper grille panel, the bell crank assembly further having an airflow barrier that is fixedly supported with respect to the bell crank assembly, the airflow barrier having a front wall that is positioned forward of the bell crank to deflect air flow received through the grille,
the bell crank being mounted to a bracket and fixedly attached to a component of the front end module through the bracket.

2. The vehicle front end assembly according to claim 1, wherein
the bell crank is supported to the front end module at a position that is forward of the radiator.

3. The vehicle front end assembly according to claim 1, wherein
the airflow barrier includes a bottom wall that extends rearwardly with respect to the front wall, the bottom wall extending below the bell crank.

4. The vehicle front end assembly according to claim 3, wherein
the bottom wall having an opening for receiving an attachment structure of the bell crank assembly therethrough.

5. The vehicle front end assembly according to claim 4, wherein
the airflow barrier further includes a rear wall positioned rearwardly with respect to the bell crank and forward of the front end module.

6. The vehicle front end assembly according to claim 5, wherein
the front wall and the bottom wall are integrally formed.

7. The vehicle front end assembly according to claim 6, wherein
the airflow barrier further includes a pair of sidewalls extending from the front wall to the rear wall.

8. The vehicle front end assembly according to claim 7, wherein
the sidewalls are integrally formed with the front wall.

9. The vehicle front end assembly according to claim 8, wherein
the sidewalls are integrally formed with the bottom wall.

10. The vehicle front end assembly according to claim 9, wherein
the rear wall is detachably attached to the sidewalls.

11. The vehicle front end assembly according to claim 9, wherein
the front wall, the bottom wall, the rear wall and the sidewalls are integrally formed as a one-piece member.

12. The vehicle front end assembly according to claim 3, wherein
the airflow barrier is mounted to the mounting bracket, the mounting bracket extending rearwardly towards the radiator and extending at an angle with respect to the front wall.

13. The vehicle front end assembly according to claim 9, wherein
the airflow barrier is mounted to the mounting bracket, the mounting bracket extending rearwardly from the rear wall towards the radiator and extending at an angle with respect to the rear wall.

14. The vehicle front end assembly according to claim 3, wherein
the airflow barrier farther includes an elastic seal, the elastic seal being disposed around a periphery of the bell crank access area.

15. The vehicle front end assembly according to claim 14, further comprising
a hood overlying the upper grille panel, the elastic seal being positioned between the upper grille panel and the hood.

16. A bell crank assembly for a vehicle, comprising:
a bell crank; and
a bell crank housing, the bell crank is movable with respect to the bell crank housing, the bell crank housing having a receptacle defined by a front wall, a bottom wall, and a pair of sidewalls and a rear wall, the bell crank being movably disposed within the receptacle,
the bell crank being mounted to a bracket through an opening in the bottom wall.

* * * * *